G. GOLLMER.
THERMO ELECTRIC THERMOMETER.
APPLICATION FILED NOV. 23, 1909.
1,176,362.
Patented Mar. 21, 1916.
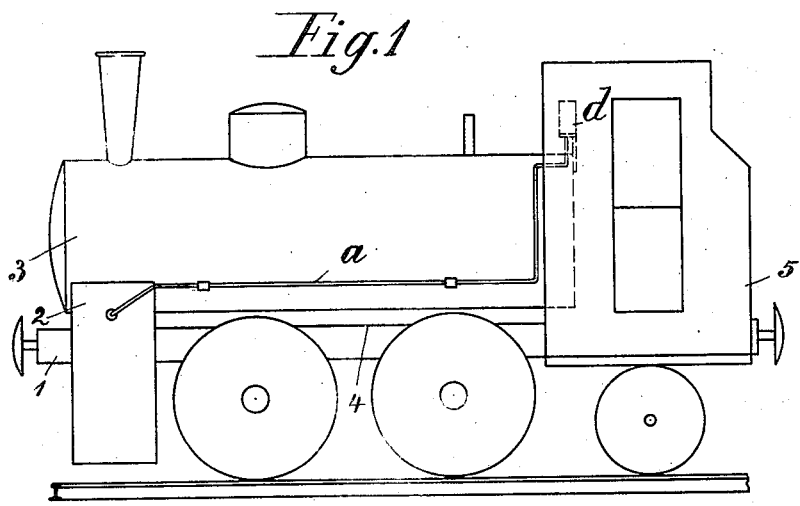
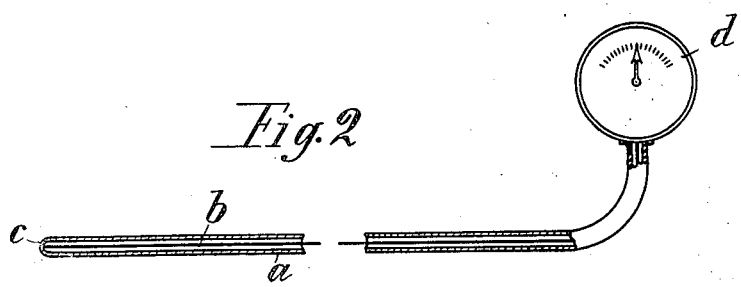
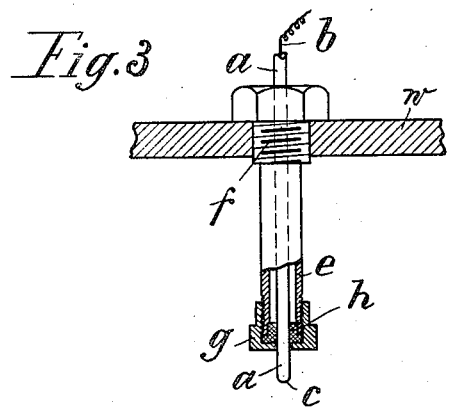
WITNESSES
H H Knight
Ray J. Ernst.
Inventor
Georg Gollmer
by
his attorneys

UNITED STATES PATENT OFFICE.

GEORG GOLLMER, OF CHARLOTTENBURG, GERMANY, ASSIGNOR TO SIEMENS & HALSKE A. G., OF BERLIN, GERMANY, A CORPORATION OF GERMANY.

THERMO-ELECTRIC THERMOMETER.

1,176,362.  Specification of Letters Patent.  Patented Mar. 21, 1916.

Application filed November 23, 1909. Serial No. 529,561.

*To all whom it may concern:*

Be it known that I, GEORG GOLLMER, a subject of the German Emperor, and residing at Charlottenburg, near Berlin, Germany, have invented certain new and useful improvements in thermo-electric thermometers of similar machines where the readings of the temperature are taken at a place remote from the point where the temperature is to be measured and where the conductor leading to the indicator is exposed to varying temperatures, of which the following is a specification.

My invention relates to thermo-electric devices for locomotives.

A primary object is to provide improved thermo-electric means for measuring the temperature in locomotives, particularly of the superheated steam.

My improved means comprise a thermo-electric couple whose soldered joint is introduced into the part of the locomotive to be measured, e. g. the superheater cylinder, and whose end is connected with an indicator constructed on the principle of a voltmeter, in the cab of the locomotive.

According to my invention the thermo-electric couple is tubular and extends directly up to the indicator, so that the soldered joints for the connection of otherwise customary wires leading in the open air to the slide-valve chest which readily have a disturbing thermo-electric action owing to the influence of the heat of the boiler and the rays of the sun are done away with. On the contrary, owing to the couple extending from the slide-valve chest to the indicator which is located in the cab and preferably on the boiler itself, the joints are in a chamber whose temperature fluctuates only very little, as is known from experience, since the radiation of heat from the boiler when working is approximately constant on the one hand, and on the other hand is very large in comparison with the temperature of the atmosphere. Accordingly, in this arrangement the correction for the connecting joints which was always necessary heretofore when measuring temperature by means of thermo-electric couples is done away with. The arrangement of the tubular thermo-electric couple without any protecting tube and connecting wires is, in addition, exceedingly simple and secure.

One illustrative embodiment of my invention is represented by way of example in the accompanying drawing, wherein:—

Figure 1 is a diagrammatic elevation showing the arrangement of my improved means on a locomotive, Fig. 2 shows the device itself on an enlarged scale, and Fig. 3 is a longitudinal section through a protecting device for the end of the thermo-electric couple inserted in the part of the locomotive whose temperature is to be measured.

Referring to the drawing, the thermo-couple comprises a copper tube $a$, in which is inclosed an insulated constantan wire $b$ soldered to one end $c$ of the protecting tube. To the other end of the protecting tube $a$ and wire $b$ is connected the indicator $d$. In Fig. 1 the soldered joint of the couple is inserted in the superheater cylinder 2 at the front of the locomotive 1. The remaining tubular portion may be led along at the boiler 3 or at the footway 4 around the latter and finally into the cab 5 where the indicator $d$ is secured on the end of the boiler.

The couple is prevented from being injured by surrounding its end projecting into the chamber to be examined by a protecting tube extending so far that only the soldered joint projects out of the same, and in order to avoid the temperature of this soldered joint being influenced by conduction of heat of the metallic protecting tube, a heat-insulating body is provided which prevents the couple contacting with the protecting tube, as will now be described.

Referring to Fig. 3, $w$ designates the wall of a chamber, e. g. superheating chamber, of a locomotive through which the thermo-couple $a$ is inserted. A protecting tube $e$ surrounds the part of the couple projecting into the chamber, said tube $e$ extending along the couple so far that the soldered joint $c$ projects only a certain distance out of the same. The protecting tube has a screw-threaded portion $f$ secured in the wall $w$ or is attached to the latter in other suitable manner and connected steam-tight at this place with the couple surrounded by it. At the end of the couple is attached by means of a cap screw $g$ a ring $h$ of soapstone or other suitable heat-insulating material which prevents the thermo-couple contacting with the protecting tube.

I claim:—

1. In a device of the character described, the combination with a thermo-electric couple having its soldered joint disposed at the place where the temperature is to be measured, an indicator disposed at a location remote from said place and constructed on the voltmeter principle, the two electrodes of said couple leading to said indicator and being connected therewith, one of said electrodes forming the protecting shell for the other throughout the latter's whole length, for the purpose set forth.

2. In a device of the character described, the combination with a thermo-electric couple having its soldered joint disposed at the place where the temperature is to be measured, an indicator disposed at a location remote from said place and constructed on the voltmeter principle, the two electrodes of said couple leading directly to said indicator without any intermediate conductor, one of said electrodes forming the protecting shell for the other throughout the latter's whole length, for the purpose set forth.

3. In a thermo-electric measuring instrument for measuring temperatures of an inclosed chamber, the combination with the wall of the chamber of a tubular shell suitably fastened therein, said shell containing a thermo-electric couple having a soldered joint at one end, said soldered end protruding beyond the inner end of the shell into the chamber, heat insulating material interposed between the shell and the couple, an indicator of the voltmeter type disposed remotely from said chamber, the two electrodes of the couple leading directly to said indicator without any intermediate conductor, one of said electrodes forming the protecting shell for the other nearly throughout the latter's whole length, for the purposes set forth.

In testimony whereof I have signed my name to this specification in the presence of two witnesses.

GEORG GOLLMER.

Witnesses:
 HENRY HASPER,
 WOLDEMAR HAUPT.